United States Patent [19]
Romesberg et al.

[11] Patent Number: 5,582,906
[45] Date of Patent: Dec. 10, 1996

[54] LAMINATED HEADLINER

[75] Inventors: Floyd E. Romesberg, Saint Louisville; David M. Steinke, Baltimore, both of Ohio

[73] Assignee: Process Bonding, Inc., Johnstown, Ohio

[21] Appl. No.: 548,190

[22] Filed: Oct. 25, 1995

Related U.S. Application Data

[62] Division of Ser. No. 243,944, May 17, 1994, Pat. No. 5,486,256.

[51] Int. Cl.⁶ .................................................. B32B 27/00
[52] U.S. Cl. ........................ 428/286; 428/246; 428/290; 428/308.4; 428/319.1; 428/319.7
[58] Field of Search .............................. 428/290, 308.4, 428/319.3, 319.7, 286, 246, 319.1

[56] References Cited

U.S. PATENT DOCUMENTS

| | | | |
|---|---|---|---|
| 4,211,590 | 7/1980 | Steward et al. | 156/79 |
| 4,350,734 | 9/1982 | Hammond | 428/308.4 |
| 4,414,265 | 11/1983 | Rosato et al. | 428/316.6 |
| 4,478,660 | 10/1984 | Landler et al. | 156/78 |
| 4,695,501 | 9/1987 | Robison | 428/316.6 |
| 4,721,643 | 1/1988 | Harayama et al. | 428/90 |
| 4,741,945 | 5/1988 | Brant et al. | 296/214 |
| 4,798,756 | 1/1989 | Fukushima et al. | 428/317.7 |
| 4,826,552 | 5/1989 | Breitscheidel et al. | 156/221 |
| 5,007,976 | 4/1991 | Satterfield et al. | |

*Primary Examiner*—Christopher Raimund
*Attorney, Agent, or Firm*—Kremblas, Foster, Millard & Pollick; Sidney W. Millard

[57] ABSTRACT

A headliner for mounting in the passenger compartment of a vehicle is formed from a plurality of layers of materials including foamed polyurethane, fiber glass and scrim. The layers are bonded together under heat which cures an incorporated thermosetting resin. The thermosetting resin freezes the assembled laminate conforming to the configuration of the lowermost mold. After setting of the resin the flexible laminate is trimmed to the desired shape at its periphery.

10 Claims, 1 Drawing Sheet

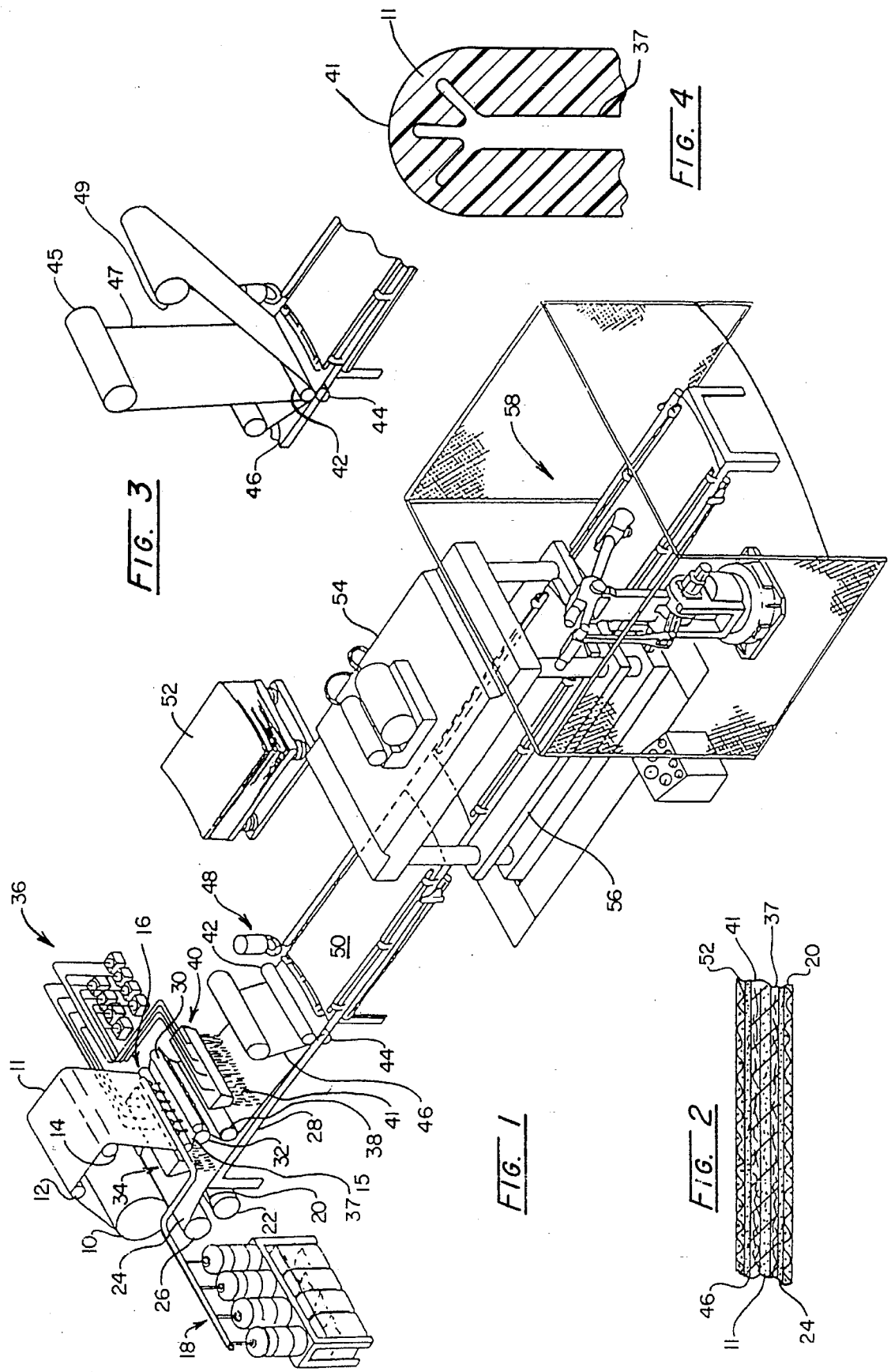

LAMINATED HEADLINER

This is a divisional application of Ser. No. 08/243,944, filed May 17, 1994, now U.S. Pat. No. 5,486,256, and a co-pending application of Ser. No. 08/548,189, filed Oct. 25, 1995.

FIELD OF THE INVENTION

This invention relates to a laminated panel and one use contemplated for the panel is as a headliner in the passenger compartment of trucks and passenger vehicles.

BACKGROUND OF THE INVENTION

Headliners for vehicles are conventionally constructed of fiber glass or multi-layered laminated panels incorporating fiber glass and foam resin layers. In the conventional manufacturing process, the layers are placed between mirror image mold surfaces, compressed, heated to cure an incorporated thermosetting resin, and then cut to shape at their periphery. Sometimes apertures for window openings, light fixtures, sun visors and the like are cut in the panels after molding. More often than not, in the assembly of the vehicle the headliner is inserted through the front window before the windshield is mounted. The typical headliner is in the shape of a dome with the concave surface facing downward. It is sufficiently rigid to hold its shape when mounted in the passenger compartment and supported along its side edges with the central part of the headliner juxtaposed to the roof.

Various problems exist in the assembly of the headliner and one of those problems is that the headliner includes a decorative layer as the exposed surface visible to the passengers. Any folds, creases or blemishes in the visible surface creates a problem for one marketing the vehicle. As a practical matter, it is unacceptable to have exposed blemishes. Also, breakage is a problem due to brittleness of the cured structure.

The headliner serves three other functions in addition to aesthetics which may be at odds with the concern for exposed blemishes. One function is to provide a soft surface to minimize injury with head bumps. Fiber glass headliners are hard as are conventional headliners incorporating foamed resin and do not provide much padding for one's head. The only cushioning is in the decorative fabric which may or may not have a soft foam backing. A second function is to provide insulation from heat between the roof of the vehicle and the interior or passenger compartment. The third function is to provide sound insulation from exterior wind noise, engine noise, and the like.

A common solution to the problem of heat and noise insulation is to use foamed resin layers in the headliner. The foamed resin is a better heat and sound barrier than resin impregnated fiber glass. Unfortunately, the foamed resin most often used is of the "closed cell" variety which includes a plurality of bubbles throughout the resin. Such foamed resin is initially quite rigid and with a sealed skin coating it is even more rigid. Therefore, when the headliner must be bent or folded out of its original molded shape to get it into the proper position for installation in the vehicle it often cracks and/or ruptures bubbles within the foamed layer itself. This often leaves a crease in the headliner which is visible through the fabric. That is also true of fiber glass headliners. Exposed creases are a problem because an exposed crease makes the flawed headliner unusable from a practical standpoint. As a consequence of the problem, the size of the windshield opening is often dictated by the size of the headliner which must be inserted (whether the vehicle manufacturer knows it or not). Making the windshield opening larger minimizes deflections of the headliner to get it in operative position.

A patent to Steward et al, U.S. Pat. No. 4,211,590, discloses a process for manufacturing a headliner for a passenger vehicle and the laminated contoured headliner includes one or more foamed resin thermoplastic layers of the closed cell variety sandwiched between a pair of rigid thermoplastic skin coats.

A patent to Harayama et al, U.S. Pat. No. 4,721,643, discloses another process for making a headliner and it too discloses a thermoplastic foamed resin layer of closed cells. The disclosure describes a laminate of a plurality of layers but all are structured so that there is a surface skin layer at each boundary of each foamed resin layer which inherently makes for rigidity and crease problems in assembling the headliner.

A patent to Landler et al, U.S. Pat. No. 4,478,660, discloses a different laminate and different process for making a foamed resin layer in a decorative panel but it is even more rigid than the headliners described above because of the incorporation of a hardenable resin mixed with wood dust filler in one layer.

A patent to Breitscheidel et al, U.S. Pat. No. 4,826,552, discloses a process for making a panel using an elastomeric, fiber glass reinforced, foam and a polymer substrate. It is clear from a reading of the patent that the rigidity of the resulting panel makes it inappropriate for a headliner.

The product on the market which is currently being used for headliners which is similar to the instant invention is a laminated panel which includes a decorative fabric layer for its exposed surface and the fabric is bonded directly to a closed cell foamed resin layer, the layer being coated on both sides with a hard resin skin. The next layer is a fiber glass mat which is sandwiched between the aforementioned foamed resin layer and another which is essentially identical. The backing layer is scrim. In both cases the closed cell foam used is coated on both sides and has an industry designation "120 ILD". The panel is relatively rigid and a fold results in a permanent crease clearly visible through the fabric layer. More recent products substitute open cell foamed resin panels which are impregnated with an isocyanate resin and an amine catalyst. The problem with that combination is that the amine catalyst (1) may be toxic at low concentrations and (2) where the vehicle sits in the summer sun, the heat "boils" the amine out of the laminate and it coats the windows as a fog.

A patent to Satterfield et al, U.S. Pat. No. 5,007,976 discloses a means to minimize fold-crease propagation to the fabric face by providing a laminated panel which is sufficiently flexible that it does not show a crease at the fabric surface even if the panel is folded three or four times over itself. This property is accomplished by using an open cell foamed thermoplastic resin of polyurethane rather than the closed-cell thermoplastic resin or the isocyanate resin-open celled combination used by the prior art. Additionally, a special adhesive mixture is used to bond the layers of material together. The adhesive is a blend of about two-thirds polyol, about one-third isocyanate, and a catalyst.

One open celled, foamed resin layer near the decorative fabric is uncoated with the adhesive and as a consequence gives the fabric surface a soft feel, due to the open cell structure. It serves the purpose of absorbing the shock of a head bump without head injury. A second open celled, foamed resin layer is located near the roof of the vehicle and it is saturated with the adhesive. The adhesive hardens during curing and the back or outermost surface of the laminate feels hard.

Within the laminate are two layers of a fiber glass mat. The two fiber glass layers are separated by other layers within the laminate and the random orientation of the fibers serves to strengthen the panel in tension in all directions.

The laminate further includes a plurality of woven layers which are known as "scrim" and "reemay", terms that are well known in the industry.

The Satterfield et al patent is commonly owned and a significant technical advancement over prior panels. However, the labor intensive aspects of its assembly create cost problems and certain disclosed materials are not adequate in certain circumstances.

The term "scrim" as used in this application refers to a thin woven or non-woven fabric not unlike cheese cloth which is formed of cotton fibers or other materials having appropriate wetting qualities to assure a proper bond with the liquid adhesive used.

As used in this application the term "reemay" refers to a mat of non-aligned fibers of spun polyester which adds strength to the overall structure.

SUMMARY OF THE INVENTION

This invention comprises a laminate of a plurality of layers of materials including an open celled-resin impregnated polyurethane foam layer sandwiched between a pair of non-woven layers of fiber glass. The laminate may be used as a vehicle headliner, package tray, vehicle door panel, spare tire cover, boot cover, meadboard panel or door panel cover. One fiber glass layer of the laminate is bounded by a layer of non-woven polyester rayon scrim or reemay. The layer intended to be exposed to the interior passenger compartment of the vehicle includes a decorative layer of fabric or vinyl material bonded to the adjacent fiber glass layer. A foam polyurethane layer may or may not be flame bonded to the decorative fabric intermediate the fiber glass layer and the decorative fabric.

The layers are assembled and cut to length prior to being inserted between a pair of heated molds at a temperature in the range 240°–375° F. for a period of 30–180 seconds to cure the resin impregnating the urethane foam layer.

Objects of the invention not clear from the above will be fully understood upon a review of the drawings and a description of the preferred embodiment which follow.

BRIEF DESCRIPTION OF DRAWINGS

FIG. 1 is a schematic perspective view of the procedural sequence of forming a headliner of this invention;

FIG. 2 is a fragmentary sectional view showing the assembled layers of the headliner;

FIG. 3 is a schematic perspective view of an alternative embodiment of a portion of the procedural sequence of FIG. 1; and FIG. 4 is a fragmentary sectional view of the configuration of layers of laminate at a bend according to this invention.

DESCRIPTION OF THE PREFERRED EMBODIMENT

FIG. 1 illustrates the procedural sequence and general schematic lay out for assembling the layers forming the headliner of this invention and it includes a roll 10 of open celled polyurethane foam 11 which is delivered over a pair of rollers 12, 14 to a housing (not shown) where an adhesive resin mixture 15 is applied to the foam layer 11 at resin impregnation station 16 from a resin source 18.

The resin source 18 is shown as four different barrels and is merely illustrative as a source and mixing mechanism. The structural features of accomplishing the mixing and delivery of the resin components are within the skill of the art and not a part of the inventive concept.

While the foam sheet 11 is being impregnated (but not saturated) with liquid adhesive resin 15 at station 16, a layer of non-woven polyester rayon scrim 20 is drawn from a roll 22 in general parallel relationship with the foam layer 11 and below the foam layer to provide the desired orientation.

A film of thermoplastic adhesive 24, preferably ethylene-acrylic acid copolymer (sold by Dow Chemical under the trade designation DAF 899) is drawn from a roll 26 and deposited over scrim layer 20. The scrim and film layers are supported on a framework 28. The non-porous film 24 prevents bleed through of the liquid adhesive resin 15 in foam layer 11 onto calender rollers 42, 44 further downstream. It further minimizes bleed through of that adhesive onto molds 54, 56 in a later manufacturing step and makes the final product essentially air impermeable. Dow XUS66406.00 is an alternative material for film 24 which may be used to prevent bleed through; it consists of two layers of the DAF 899 copolymer sandwiching therebetween a layer of high molecular weight polyethylene which has a high melt tension and will maintain a continuous film at a high temperature of about 375° F. Accordingly, the upper mold 54 temperature limit of about 375° F. will not allow the liquid adhesive impregnating foam layer 11 to leak through to scrim layer 20.

It will be observed that the foam layer 11 passes between a pair of pinch rollers 30, 32 after being impregnated with resin at station 16. Rollers 30, 32 are within the housing (not shown) and serve to distribute the thermosetting resin 15 uniformly in the foam layer 11. Ultimately the foam layer 11 is sandwiched between a pair of fiber glass layers which are bonded to the foam layer by the resin dispensed at station 16 and partially absorbed in the contacting fiber glass layers.

Just upstream from the resin dispensing station 16 is a first fiber glass chopping station 34 which receives strands of fiber glass from a source 36, chops them to the preferred length of about 1–3 inches and deposits them as a layer 37 on the adhesive film 24 in a suitable thickness prior to the time the impregnated foam layer 11 comes into contact with the scrim-resin film layers. A suitable thickness is achieved by distributing the cut rovings in an amount of about 4–16 gm/ft$^2$. The result is a layer about 0.2 mm thick at the conclusion of the molding process. The preferred physical characteristics of the fiber glass prevent "strike through" of the image of the glass through the vinyl or decorative fabric layer 52. Where the fabric or vinyl decorative layer 52 includes a thin foam backing layer, the physical characteristics of the fiber glass are less critical because the foam layer absorbs the rough surface and does not allow it to show through. The physical characteristics found useful in this invention are found in Vetrotex Certain Teed trade designation 221/113 yield and Owens Corning fiber glass designated as 110 yds/lb., 205 yds/lb. and 211 yds/lb. (QC995AA-211).

Roller 38 orients foam layer 11 in its movement from work station 16 along framework 28 upstream of a second fiber glass chopping station 40. Fiber glass chopping station 40 applies a second layer of fiber glass 41 to the laminate being formed on framework 28 such that a fiber glass layer having a given fiber glass size, length and thickness is in direct contact with foam layer 11. The physical characteristics of the fibers 41 are the same as from station 34 and the thickness of the layer should be about the same. The resin 15 impregnating the foam layer 11 can serve to wet both fiber glass layers 37, 41 as the various layers pass between a pair of calender rollers 42, 44 as a second layer of thermoplastic film or web adhesive 46 is being applied above the second layer of fiber glass 41. In some cases the film 46 is identical in physical and chemical composition to film 24.

FIG. 3 illustrates an alternative embodiment where the web adhesive 46 is not the same composition and configuration as film adhesive 24. In some embodiments it is desirable to have web 46 as a porous unit such that it does not provide a barrier to the passage of sound. In other cases web 46 may be impervious to air to minimize dust penetration. Film 24 is not porous; accordingly, sound waves penetrating a passenger compartment from the roof which pass through fiber glass layers 41 and 37 and foam layer 11 are reflected from film layer 24 back through the sound absorbing sheets 37, 11, 41. Making adhesive web 46 of a non-porous configuration causes a substantial portion of such sound waves to be reflected toward the vehicle roof without ever reaching the sound deadening fiber glass and foam layers. The result is called the "tin can effect" where the sound waves rattle back and forth between the roof and film 46. That is undesirable.

On the other hand where web 46 is porous, it is not a sound barrier. Accordingly, sound waves pass through web 46, etc. and are dampened twice; the first time in traveling through the multi-layer composite to non-porous film 24 and the second time as the sound waves are reflected from film 24 back through the composite.

The use of a porous web 46 creates a problem which is solved by the structure illustrated in FIG. 3. The problem is the bleeding of the resin 15 from foam sheet 11 through the porous web 46 onto calender roller 42 or mold 54. The buildup of the liquid resin from work station 16 on roller 42 is prevented by providing a roll 45 of a protective film or barrier layer 47 between web 46 and roller 42. Any resin bleeding through web 46 is collected on the facing surface of film 47 and is withdrawn with film 47 to a windup roll 49 which is later discarded.

As another consideration, where decorative layer 52 and scrim layer 20 are sufficiently absorbent that bleed through can be eliminated, the layers 24 and 46 may comprise a "net" of polyethylene. Polyethylene is much less expensive and can serve the purpose of supporting and confining the fiber glass rovings from work stations 34 and 40. The net allows the liquid adhesive 15 from foam layer 11 to migrate through the fiber glass and net to bond the outer scrim and fabric layers to the composite.

In the preferred embodiment of FIG. 1, a cutter 48 severs the calendared laminate to length to provide a sheet 50 of desirable length. A similarly shaped decorative cover layer 52 of woven fabric, permeable vinyl or impermeable vinyl is manually applied over the severed laminated sheet 50. It will be clear that the manual operation of depositing decorative layer 52 on severed sheet 50 may be mechanized if desired. The decorative layer 52 may or may not have an open celled foam layer as a backing between it and the second fiber glass layer 41.

The composite is then moved between a pair of molds 54, 56 which are brought together to heat and lightly compress the laminate to melt the adhesive film layers 24, 46 and set the thermosetting liquid resin 15 impregnating the foam layer 11. Thereby the heat freezes the layers in a shape conforming to the lower mold surface and the ultimate sequential bonding occurs as the laminate cools and liquid adhesive layers 24, 46 cool and harden.

Ordinarily the decorative sheet 52 is a sufficient barrier against any resin bleeding through web 46 reaching upper mold 54. Resin buildup on calender rollers 42, 44 and molds 54, 56 is highly undesirable because the resin is extremely difficult to remove. It may require wire brushing and the like and the act of wire brushing mars the surface of the roller or mold, making subsequent resin deposition even more likely. To combat this problem, rolls and molds are provided with a coating of baked on silicone. This allows any resin bleed through to be removed by solvent cleaning. Thereafter the rolls or molds may be re-sprayed with a new silicone layer.

FIG. 1 illustrates a steam nozzle cutting station 58 as one alternative embodiment, but it is within the contemplation of the invention to have an anvil and cutting blade (not shown) at the desired peripheral shape of the headliner to be incorporated as a part of the two mold elements 54, 56 such that, when the molds at a temperature in the range of about 275°375° F. have cured the thermosetting resin 15 adequately for a period of 30–180 seconds, the molds 54, 56 may be pressed together to cause the knife to sever the peripheral edges of the headliner by engaging the anvil.

The thermosetting adhesive resin mixture 15 applied at 16 is about one-half polyether polyol, preferably in the range of about 50–60% by volume, about one-half aromatic isocyanate by volume with an appropriate catalyst if desired of about 0.0–0.2% by volume. Preferably the volume of isocyanate is in the range from about 40–50%. The resin mixture 15 should have an index of about one.

Preferred polyols comprise a hydroxyl terminated poly-(oxyalkylene) polyol, of appropriate molecular weight and functionality, such as obtainable from Dow Chemical as VORANOL 446. A small amount of (up to about 6%) VORANOL 800 (trademark of Dow Chemical Co.) may be used effectively. Such polyether polyols may be used in the adhesive mixture 15 to achieve the desired hardness and flexibility in the cured resin.

The preferred isocyanate is a polymethylenepolyphenylene ester of isocyanate acid, such as obtainable from Mobay Corporation under the trade designation MONDUR MR or Dow Chemical designation Dow Pappi 2027, whose composition consists essentially of about 45–55% of diphenylmethane diisocyanate (MDI), about 45–55% of higher oligomers of MDI, and a trace of phenyl isocyanate.

Suitable catalysts are available from Air Products and Chemicals, Inc. under the trade designation DABCO T-12 (a specially formulated high-boiling liquid dibutyltin dilaurate) or the like. The proportions of catalyst needed may vary, depending upon curing temperature, relative humidity of the air (normally in the range 35–80%) and other factors known in the industry. By way of preferred example, in the above stated environmental conditions, about 0.11 parts per 100 parts polyol. Preferably the catalysts are added to the polyol prior to its mixture with the isocyanate. With adequate increased portions of the VORANOL 800 resin, the catalyst may be eliminated entirely.

While the preferred embodiment is described with a particular polyol, isocyanate and catalyst, it will be clear that the time periods and the temperatures for curing could be modified by adjustment of the catalyst and other perimeters and these would be obvious modifications well within the inventive concept. Similarly, the curing time might be reduced for the liquid resin adhesive by a controlled increase in the humidity in the vicinity of the mold.

The preferred foam for foam layer 11 is sold under the trade designation Carpenter L51Y (density 1.2, 65 ILD). A useful foam is Burkart 12024 (density 1.2, 24 ILD). Preferably foam layer 11 has a thickness of about 0.1–1.1 inches and most preferably a thickness of about ¼ inch. The density has an operable range of about 0.7–2 pounds per cubic foot; the foam should have an ILD in the range 10–80; and a permeability based on Dow Chemical Flow Meter in the range 2–8 cfm, preferably 4–6 cfm. Where this foam is used with the prior art isocyanate resin and amine catalyst, the cured resin makes the foam layer too crumbly or brittle for effective use; blemishes at the decorative surface are too evident. On the other hand, where the polyurethane liquid resins (VORANOL 446 and 800) are used the cured resin and foam combination is sufficiently rigid for parts like headliners yet flexible enough to bend without breaking.

The theory of operation for the headliner is that the two layers of fiber glass 37, 41 act as the outside flanges of an I-beam and the foam layer 11 is the bridge between the flanges. The combination of the foam and cured polyurethane resin achieves a desired compression modulus to allow the glass layers to perform their I-beam functions. Should the bending forces on the headliner overcome the compression modulus, the cured polyurethane is sufficiently flexible as to allow the foam to partially collapse. As a result the foam core gives so that the inside skin layer 37 crinkles to form a turkeyfoot-like configuration as illustrated in FIG. 4. The fiber glass layers 37, 41 remain the same length and the crinkling of inner layer 11 is allowed because of the properties of foam core 11. This allows a resilient flexing of all the layers without a cracking or breaking of the laminate. Thus, there is no blemish to propagate to the decorative surface. To facilitate a uniform controlled crimp or crinkle pattern where a fold is expected, surface grooves are formed in the laminate by the molds 54, 56. Thereby, the turkeyfoot pattern is predictable as to pattern and location.

One significant advantage of substituting liquid polyurethane for isocyanate is the reduction of curing temperature. Isocyanate cures at about 375° F. At that high a temperature it is not possible to use a vinyl decorative layer in the single molding step of this invention. Vinyl deteriorates at 375° F.

With this invention a fabric decorative layer 52 may be cured at 375° F. in about 45 seconds. That is not a problem. The problem is the one step molding process using a vinyl sheet for the decorative layer 52. Using the preferred liquid polyurethane resin mixture 15 at work station 16 allows a curing temperature at molds 54, 56 of about 230° F. or above. For example at 250° F. the polyurethane is adequately cured in about ninety seconds.

The preferred adhesive film 24 is an ethyleneacrylic acid copolymer sold under the Dow Chemical trade designation DAF 899. On those occasions where the web adhesive 46 is porous, the web is formed of strands of non-woven polyester or polyamide sold under the trade designations Bostic 5620 (for vinyl) and Bostic 5220 (for woven fabric), respectively. The DAF 899 film may be used with either a vinyl or a fabric decorative cover because it has a melting point of about 250° F. A polyester web 46 is preferably used only with vinyl; it melts at about 230° F. and the molding takes place at above about 240° F. A polyamide web 46 is preferably used only with a fabric layer 52 as it melts at about 300° F. and the molding step takes place above about 320° F.

FIG. 2 is a fragmentary illustration of the layering of the headliner as it will appear before entering the molds 54, 56. It will be quite clear that after the laminate has been heated and cured in the molds, the layers will be less distinct than is illustrated in FIG. 2.

The resulting laminate is flexible and may be folded or distorted in assembling the same in the passenger compartment of a vehicle without causing unsightly creases at the decorative fabric surface.

During the heating step between molds 54, 56 it is preferable to keep the upper mold 54 at about 15° cooler than the lower mold 56 because of material and temperature considerations and the temperature differential provides a more uniform heat distribution in the laminate. For example, with a woven fabric of polyester as decorative layer 52, the polyester material tends to soften and give a distorted appearance above about 350° F.; thus, a suitable cure for the problem is achieved by having mold 56 at about 375° F. and mold 54 at about 360° F. Other materials may have different temperature maximums but the concept remains the same, for example, with vinyl, mold 54 should be maintained at about 240°–280° F. while mold 56 could still be as high as about 370° F.

Having thus described the invention in its preferred embodiment, it will be clear that other modifications may be made without departing from the spirit of the invention. Also the language used to describe the inventive concept and the drawings accompanying the application to illustrate the same are not intended to be limiting on the invention. Rather it is intended that the invention be limited only by the scope of the appended claims.

We claim:

1. A headliner formed from laminated layers of foamed resin, fiber glass, non-woven scrim and a decorative layer wherein, the foamed resin layer has a thickness in the range 0.1–1.1 inches, a layer of fiber glass is secured on each side of said foamed resin layer, each of said fiber glass layers being distributed uniformly to in an amount in the range of about 4–16 gm/ft$^2$, each fiber glass layer being bonded to said foamed resin layer by a thermosetting resin impregnating said foamed resin layer and partially impregnating said fiber glass layers, said thermosetting resin being a mixture of about 50–60% by volume polyether polyol, about 40–50% by volume aromatic isocyanate and about 0.0–0.2% by volume catalyst and being blended such that after curing the resin impregnated foam bends rather than breaks upon deflection, one of said layers of fiber glass having a surface remote from said foamed resin, said remote surface being bonded to a non-woven layer of rayon fiber scrim by a sheet of non-porous thermoplastic resin, the other of said layers of fiber glass having a surface remote from said foamed resin, said other remote surface being bonded to a decorative layer by a sheet of thermoplastic resin.

2. The headliner of claim 1 wherein said decorative layer is selected from the group consisting of woven fabric, porous vinyl, and non-porous vinyl.

3. The headliner of claim 1 wherein said foamed resin layer is of open celled polyurethane having a thickness of about ¼ inch, a density in the range of about 0.7 to 2 pounds per ft$^3$ and an ILD in the range 10–80.

4. The headliner of claim 3 wherein both said fiber glass layers have a thickness of about 0.2 mm.

5. The headliner of claim 3 wherein both sheets of thermoplastic resin are of ethyleneacrylic acid copolymer.

6. The headliner of claim 4 wherein the sheet of thermoplastic resin bonding said scrim layer to said other of the fiber glass layers is ethyleneacrylic acid copolymer and the sheet of thermoplastic resin bonding said decorative layer to one of said fiber glass layer is porous and formed of strands selected from the group consisting of polyether resin, polyamide resin or mixtures thereof.

7. The headliner of claim 3 wherein both sheets of thermoplastic resin are of ethyleneacrylic acid copolymer.

8. The headliner of claim 3 wherein said scrim layer is bonded to one of said fiber glass layers by ethyleneacrylic acid copolymer and said decorative layer is bonded to the other of said fiber glass layers by a porous resin sheet formed of strands selected from the group consisting of polyether resin, polyamide resin and mixtures thereof.

9. The headliner of claim 1 wherein said scrim layer is bonded to one of said fiber glass layers by ethyleneacrylic acid copolymer and said decorative layer is bonded to the other of said fiber glass layers by a porous resin sheet formed of strands selected from the group consisting of polyester resin, polyamide resin and mixtures thereof.

10. The headliner of claim 1 wherein both sheets of thermoplastic resin are of ethyleneacrylic acid copolymer.

* * * * *